US006368219B1

(12) United States Patent
Szrek et al.

(10) Patent No.: US 6,368,219 B1
(45) Date of Patent: Apr. 9, 2002

(54) SYSTEM AND METHOD FOR DETERMINING WHETHER WAGERS HAVE BEEN ALTERED AFTER WINNING GAME NUMBERS ARE DRAWN

(75) Inventors: Walter Szrek, East Greenwich, RI (US); Thomas K. Oram, Hudson, MA (US)

(73) Assignee: Gtech Rhode Island Corporation, West Greenwich, RI (US)

( * ) Notice: Subject to any disclaimer, the term of this patent is extended or adjusted under 35 U.S.C. 154(b) by 0 days.

(21) Appl. No.: 09/418,945

(22) Filed: Oct. 15, 1999

(51) Int. Cl.[7] ............................................... G06F 17/00

(52) U.S. Cl. .......................................... 463/42; 463/25

(58) Field of Search ............................ 463/17, 18, 25, 463/26, 27, 28, 29, 42; 380/251

(56) References Cited

U.S. PATENT DOCUMENTS 5,343,527 A * 8/1994 Moore .......................... 380/4
5,643,086 A * 7/1997 Alcorn et al. ................ 463/29
5,772,510 A * 6/1998 Roberts ....................... 463/17
5,871,398 A * 2/1999 Schneier et al. .............. 463/16
5,935,000 A * 8/1999 Sanchez, III et al. ......... 463/17
5,970,143 A * 10/1999 Schneier et al. .............. 380/23

* cited by examiner

*Primary Examiner*—Valencia Martin-Wallace
*Assistant Examiner*—Julie Brocketti
(74) *Attorney, Agent, or Firm*—Peter J. Manus; Steven M. Jensen; Edwards & Angell, LLP

(57) ABSTRACT

A system and method for determining whether wager data for players' wagers placed on a drawing game have been altered after winning game elements are drawn includes a host computer and a verification device. The host computer stores the wager data and generates a first hash value for the wager data at a time prior to drawing the winning game elements. The host computer is capable of generating a second hash value for the wager data at a time subsequent to drawing the winning game elements for comparison to the first hash value. The verification device receives the first hash value for the wager data prior to drawing the winning game elements and receives the winning game elements.

21 Claims, 3 Drawing Sheets

SYSTEM AND METHOD FOR DETERMINING WHETHER WAGERS HAVE BEEN ALTERED AFTER WINNING GAME NUMBERS ARE DRAWN

BACKGROUND OF THE INVENTION

This invention relates to a system for playing a wagering game based on a drawing, and in particular, a system for determining whether wagers have been altered after winning game numbers are drawn.

Lottery and keno games are typical wagering games in which a gaming authority conducts periodic drawings of winning elements such as winning game numbers. In such games, each player selects a series of game elements, e.g., game numbers chosen from a set of numbers, which the player believes will be drawn during a subsequent drawing of winning game numbers from the set of numbers. For example, in a lottery game, a player may select six game numbers from the set of integers 1 through 40 which the player believes will match six winning game numbers drawn by the gaming authority. Similarly, in a keno game, a player may select 10 game numbers from the set of integers from 1 through 80 which the players believes will match 10 out of 20 numbers drawn by the gaming authority. Drawings for lottery games typically occur once or twice a week, while drawings for keno games can occur at intervals as short as several minutes.

Drawing games such as lottery and keno games are typically played using electronic gaming systems. Such electronic gaming systems include geographically dispersed gaming terminals for placing players' wagers. The terminals are connected to a host computer that usually records wagering information relating to the players' wagers in an electronic storage device such as a magnetic medium.

For security purposes, an electronic gaming system requires a mechanism for ensuring that existing wagering information is not altered after the drawing of winning game numbers to create a fraudulent wager containing game numbers that match the winning game numbers. The alteration may be any modification, deletion, addition or corruption of the wagering information. Several methods have been used to determine whether wagering information has been altered after a drawing of winning game numbers.

For games in which drawings occur once a day or less often, an electronic or printed copy of the wagering information for all wagers placed on the game can be made and secured at a remote location before the winning game numbers are drawn. At any time after the drawing, the secure copy of the wagering information can be compared to the wagering information stored in the host computer on a record-by-record basis to determine whether any alterations were made to the wagering information. This technique is time consuming, and is difficult to use with games in which drawings occur every few minutes.

A second technique involves use of an internal control system (ICS) connected to the host computer to perform auditing functions. In addition to recording the wagering information for every wager in the host computer, a copy of the wagering information for each wager is sent to the ICS. Before the winning game numbers are drawn, the ICS must assure that it has received a copy of all wagering information for the game. Thus, there must be no technical failures of the system or loss of communication between the gaming terminals and the host computer prior to the drawing. To perform the auditing function properly, the ICS must also be able to determine independently that the winning game numbers have not been drawn when the last wager is placed.

A third technique involves writing all wagering information to a fixed medium such as a write once removable media (WORM) drive. Once wagering information has been written to the WORM drive, it cannot be altered. This technique helps to prevent alteration of wagering information, but does not determine whether any alterations have been made prior to writing the wagering information to the WORM drive. A limitation of a WORM drive is that its use requires ensuring that all wagering information has actually been written to the WORM drive prior to drawing the winning game numbers.

SUMMARY OF THE INVENTION

In general, in one aspect, the invention features a system for determining whether wager data for players' wagers placed on a drawing game have been altered after winning game numbers are drawn. A host computer stores the wager data and generates a first hash value for the wager data at a time prior to drawing the winning game elements, the host computer being capable of generating a second hash value for the wager data at a time subsequent to drawing the winning game elements for comparison to the first hash value. A verification device receives the first hash value for the wager data prior to drawing the winning game elements and receives the winning game elements.

Implementations of the invention may also include one or more of the following features. The wager data may include players' game numbers and wager amounts.

The host computer may generate an intermediate hash value prior to generating the first hash value. The host computer may generate a transaction hash value for each of the players' wagers. The host computer may generate a first digital signature to uniquely identify the host computer, and append the first digital signature to the first hash value.

The verification device may generate a combination hash value for the winning game elements and the first hash value, and transmit the combination hash value and the winning game elements to the host computer. The host computer may generate a check hash value for the winning game numbers and the first hash value, and compare the check hash value to the combination hash value. The verification device may generate a second digital signature to uniquely identify the drawing device, and append the second digital signature to the combination hash value.

The host computer may include a memory for storing the wager data and the first hash value. The system may further include a gaming terminal for generating the wager data. The system may further include a drawing device for drawing the winning game elements. The system may also include an auditing device in communication with the host computer for generating a third hash value for the wager data and comparing the first hash value to the third hash value.

In general, in another aspect, the invention features a method of detecting whether any of a plurality of stored wager data for players' wagers placed on a drawing game has been altered after winning game elements are drawn. A first hash value for the plurality of stored wager data is generated before the winning game elements are drawn. A second hash value for the plurality of stored wager data is generated after the winning game elements are drawn. The first hash value is compared to the second hash value.

Implementations of the invention may also include one or more of the following features. The method may further include determining that at least a portion of the plurality of stored wager data has been altered based on a comparison of the first hash value and the second hash value. The method may also include transmitting the first hash value to an independent location before the winning game elements are drawn.

The first hash value and the second hash value may be generated using a one-way hashing function. The method may include generating an intermediate hash value based on a portion of the plurality of stored wager data prior to generating the first hash value. The method may also include generating a transaction hash value based on the stored wager data for each of the players' wagers.

In general, in another aspect, the invention features a method of securing a plurality of wager data for players' wagers placed on a drawing game. A wager data hash value for the plurality of wager data is generated at a first location. The wager data hash value is sent to a second location. The winning game elements are drawn. A combination hash value for the wager data hash value and the winning game elements is generated at the second location. The winning game elements and the combination hash value are transmitted to the first location.

Implementations of the invention may also include one or more of the following features. The method may include generating a check hash value for the wager data hash value and the winning game elements at the first location, and comparing the combination hash value to the check hash value. The method may also include appending a digital signature to the combination hash value at the second location.

An advantage of the present invention is that alterations of wager data after drawing the winning game numbers can be detected without having to make a copy of all of the wager data before the winning game numbers are drawn and without having to make a record-by-record comparison of the wager data before and after the drawing.

An additional advantage of the present invention is that alteration of wager data may be easily detected by a computer with limited processing and storage capacities.

A further advantage of the present invention is that wager data may be secured prior to drawing the winning game numbers for a game having any drawing frequency and using any drawing method, e.g., manual or electronic.

Other features and advantages of the invention will become apparent from the following detailed description, and from the claims.

DESCRIPTION OF THE PREFERRED EMBODIMENTS

The present invention relates to the use of hash values and digital signatures to enhance the security of wager data for a drawing game. A unique hash value for the wager data is generated before the winning game numbers are selected. If the wager data is altered after the winning game numbers have been selected, a hash value subsequently generated for the altered wager data will not match the original hash value for the wager data.

A hash value is a fixed numerical value or string of digits generated from text, i.e., a string of text characters. The hash value is a numerical representation of the contents of the text, and is smaller than the text in that it may be stored in less memory space than the text itself. The hash value is preferably generated by a one-way hashing function, which is a formula or algorithm applied to the text for which it is extremely unlikely that the same hash value will result from applying the hashing function to a different text.

A digital signature is a digital code attached to an electronically transmitted message that uniquely identifies the sender of the message. A one-way hashing function may be used to create the digital signature.

Figure 1:
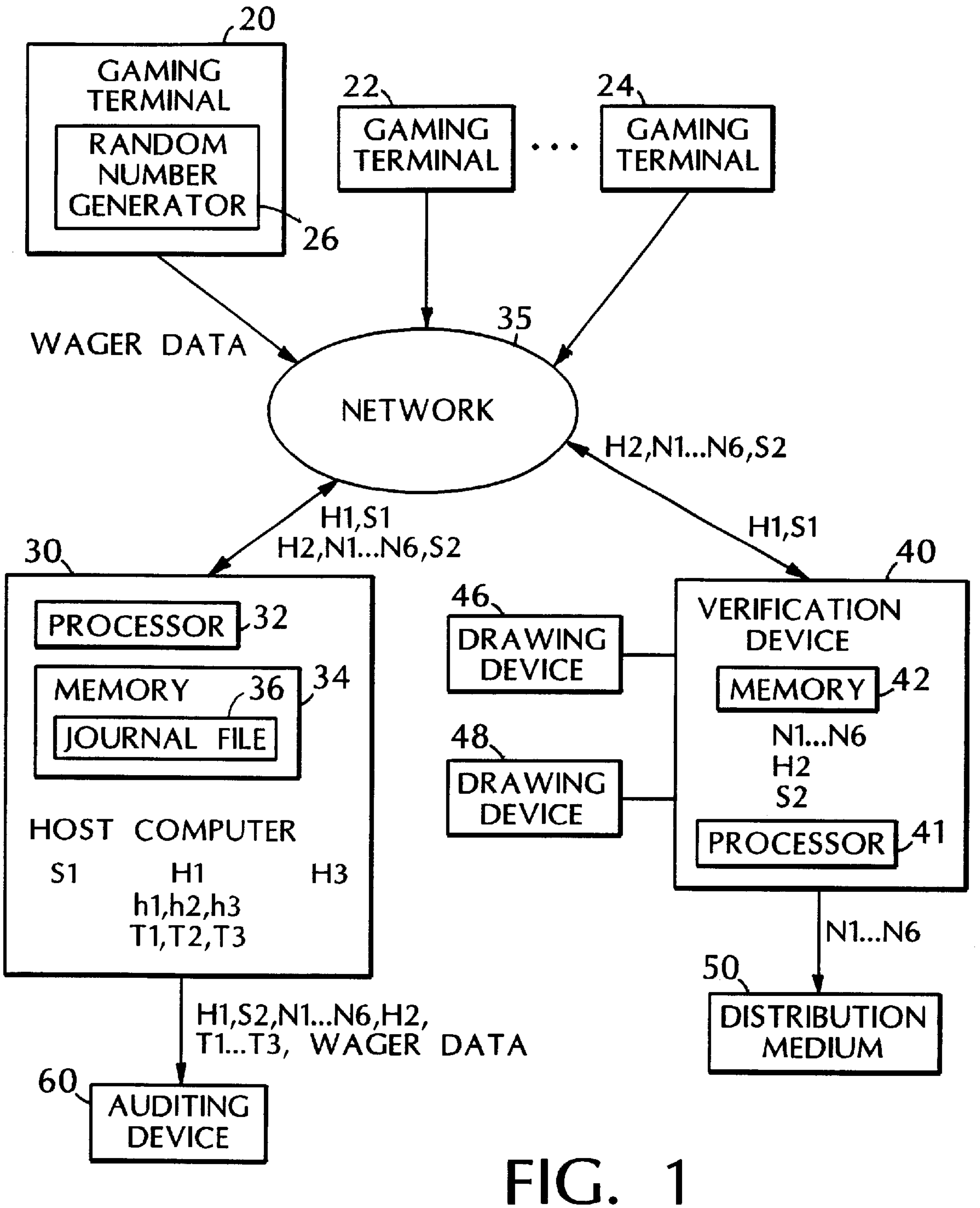
FIG. 1 is a diagrammatic sketch of a gaming system according to the present invention.
Figure 2A:
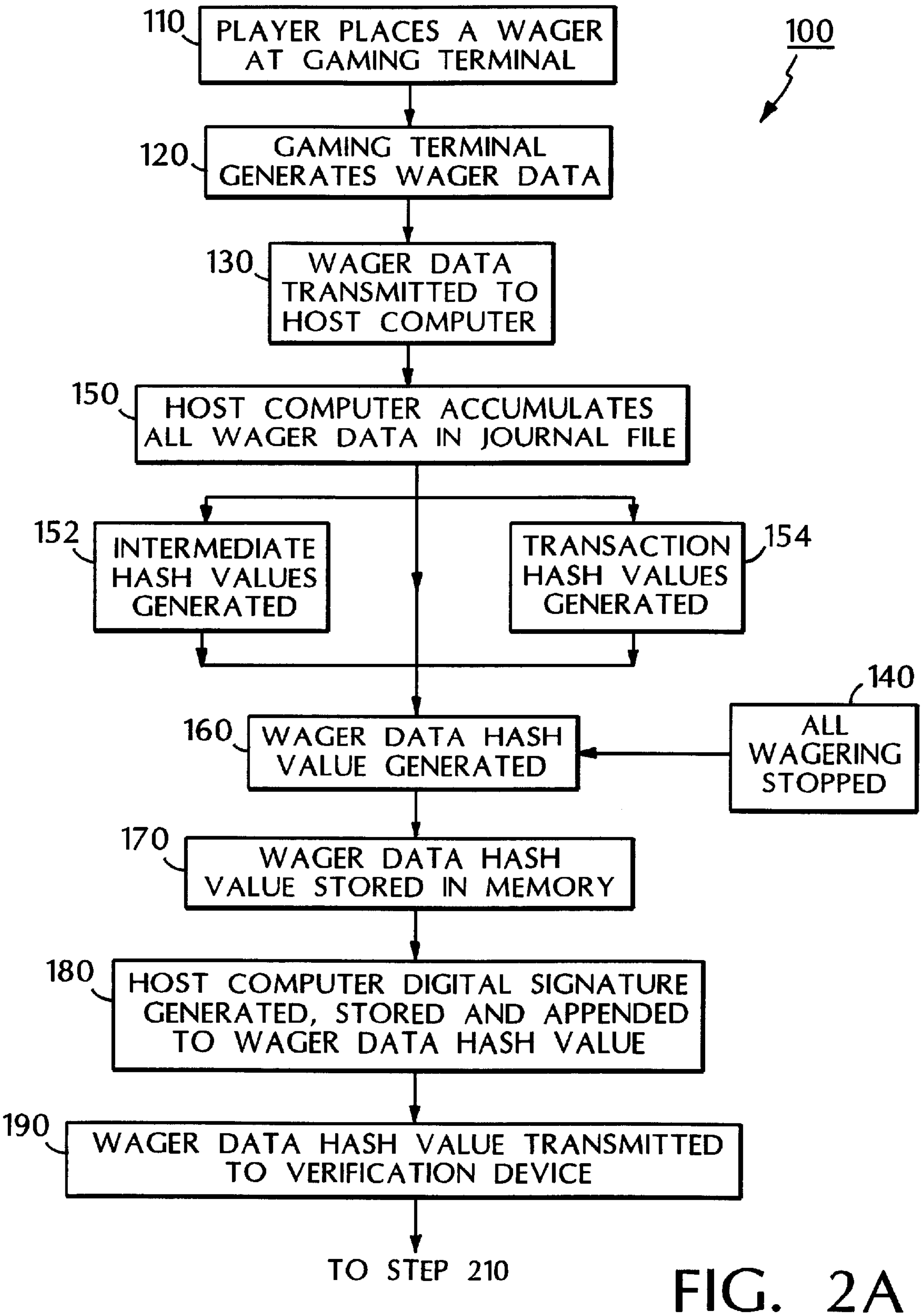
FIGS. 2A and 2B are a flow chart showing the operation of the gaming system of FIG. 1.
Figure 2B:
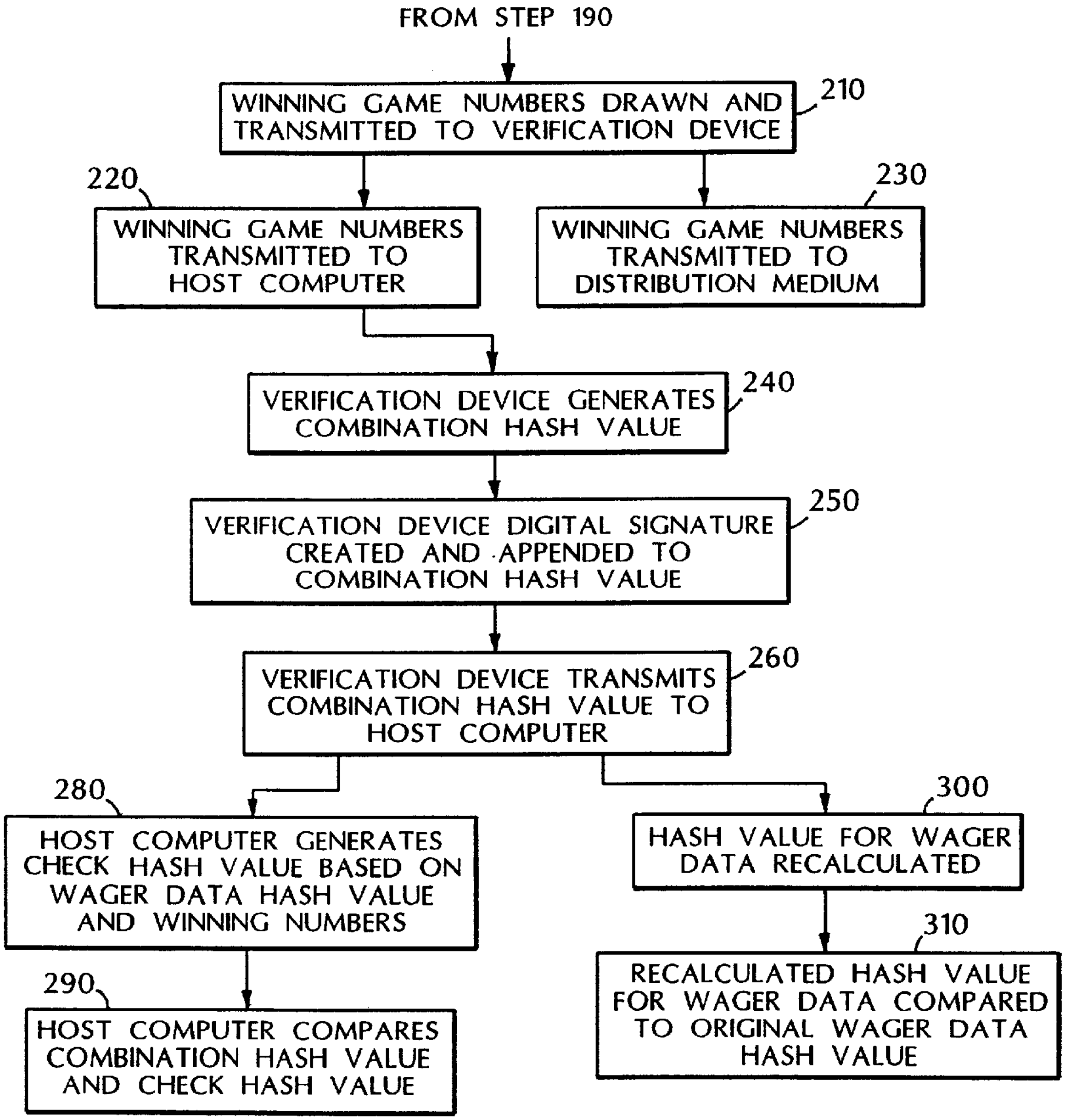

FIG. 1 shows a gaming system 10 for determining whether wagers have been altered after winning game numbers have been drawn. FIGS. 2A and 2B are a flow chart showing a method 100 of operating gaming system 10 to determine whether wagers have been altered after winning game numbers have been drawn.

Gaming system 10 includes a gaming terminal 20, a host computer 30, and a verification device 40. These components of gaming system 10 may communicate with each other over a network 35. Network 35 is preferably a secure, private network. Network 35 may also be the Internet or any communications network such as a dial-up, hard-wired or wireless digital network. Any data, messages or files transmitted over network 35 may be encrypted for security.

A player places a wager for a drawing game at gaming terminal 20 (step 110). For example, the player may tender a wager amount in the form of cash money to an operator of the gaming terminal in exchange for a gaming ticket printed by the gaming terminal including the player's game numbers and the wager amount. System 10 may also include a plurality of similar gaming terminals 22 . . . 24 connected over network 35.

Gaming terminal 20 generates wager data including the player's game numbers and wager amount (step 120). The player's game numbers may be selected by the player or chosen randomly, e.g., using a random number generator 26 to perform a "quick-pick" function. The wager data may also include other data pertaining to the player's wager, such as the amount wagered, the date of the wager, the game for which the wager was made, the location of gaming terminal 20, the name of the player, non-wager transactions and wager pool totals.

Wager data generated by gaming terminal 20 is transmitted to host computer 30 over network 35 (step 130). Host computer 30 includes a processor 32 and a memory 34 for processing and storing data transmitted to the host computer from gaming terminal 20. Memory 34 further includes a journal file 36 for storing data pertaining to gaming transactions processed by the host computer.

At some point before winning game numbers are drawn for a drawing game, all wagering for the game is stopped (step 140). In the meantime, host computer 30 accumulates all of the wager data for a particular game in journal file 36 (step 150). Processor 32 applies a hashing function to generate a wager data hash value H1 for at least the game numbers and wager amounts of all of the players' wagers for the game (step 160). The hashing function is preferably a one-way hashing algorithm and can be, e.g., MD5, SHA, or any other strong cryptographic method. The wager data hash value H1 is stored in memory 34 (step 170).

If there is too much wager data to handle quickly or efficiently, or if too much time is required to generate the wager data hash value H1, then intermediate hash values h1 . . . h3 may be generated at predetermined intervals for portions of the wager data being accumulated for the game (step 152). Each intermediate hash value h1 . . . h3 may be generated based on all of the new wager data pertaining to wagers made during a time interval as well as the intermediate hash values generated during previous intervals.

If sufficient calculating time is available, it may also be possible to generate a transaction hash value T1 . . . T2 for each individual wager (step 154). Thus, the transaction hash value is calculated from a subset of all of the wager data generated for the drawing game. The transaction hash values T1 . . . T2 may then be stored in journal file 36 along with the wager data, with intermediate hash values h1 . . . h2, or with wager data hash value H1. Storing transaction hash values T1 . . . T2 provides a simple way of determining which transactions may have been altered.

Host computer 30 may also create a digital signature S1 based on wager data hash value H1 to uniquely identify the host computer. The digital signature may be created using a cryptographic signature algorithm, e.g., DSS. Digital signature S1 is stored in memory 34 and appended to wager data hash value H1 (step 180).

Verification device 40 is an independent location which receives the wager data hash value. Verification device is associated with one or more drawing devices 46, 48, which draw the winning game numbers. Verification device 40 may also include a processor 41 and a memory 42.

Host computer 30 transmits wager data hash value H1 with appended digital signature S1 to verification device 40 prior to the drawing of the winning game numbers (step 190). By checking digital signature S1, e.g., using public key cryptography, verification device 40 can verify that the wager data hash value was sent by the correct host computer.

After the wager data hash value has been received and digital signature S1 has been verified, winning game numbers N1 . . . N6 for the drawing game are selected by drawing device 46 and transmitted to the verification device (step 210). Verification device 40 may store the winning game numbers in memory 42 and transmit the winning game numbers to host computer 30, which stores the winning game numbers in the memory 34 (step 220), and to a distribution medium 50 for transmitting the winning game numbers to the players of the game by, e.g., closed-circuit television, publicly-accessible television or printed publication (step 230).

Verification device 40 also uses a hashing function to generate a combination hash value H2 based on both the wager data hash value H1 and the winning game numbers N1 . . . N6 (step 240). Verification device 40 transmits combination hash value H2 to host computer 30 (step 260). The verification device may also create a digital signature S2 based on combination hash value H2 and append digital signature S2 to the combination hash value so that host computer 30 can verify the authenticity of the verification device that transmitted the winning game numbers (step 250).

After receiving the winning game numbers from verification device 40, host computer 30 verifies that the winning game numbers were transmitted by the correct verification device. Host computer 30 then applies a hashing function to both wager data hash value H1 and winning game numbers N1 . . . N6 to generate a check hash value H3 (step 280). The host computer authenticates the winning numbers N1 . . . N6 received from the verification device by comparing combination hash value H2 to check hash value H3 (step 290). If these hash values are the same, then the winning game numbers N1 . . . N6 received by host computer 30 are deemed to be authentic.

To determine whether any wager data for the drawing game has been altered, the hash value for the wager data may be recalculated at any time for the wager data stored in journal file 36 (step 300), and compared to the original wager data hash value H1 (step 310). It would be nearly impossible to alter any of the wager data without affecting the recalculated hash value for the wager data. If the recalculated hash value for the wager data differs from the original wager data hash value H1, then the gaming authority may conclude that some of the wager data has been altered. The gaming authority may then search through the stored wager data to determine which portion of wager data was altered.

The data stored in memory 34 and the contents of journal file 36 may also be copied and transmitted to an independent auditing device 60, e.g., by digital electronic transmission or by physical delivery of the data. Auditing device 60 uses wager data hash value H1, combination hash value H2, winning game numbers N1 . . . N6, the original wager data or transaction hashes T1 . . . T2, and digital signature S2 of verification device 40 to verify the following:

1. Only correct wagers were included in the drawing game, and none of the wager data was altered;
2. The verification device that transmitted the winning game numbers was the correct verification device; and
3. The winning game numbers transmitted by the verification device were the same as those recorded in the journal file.

Either host computer 30 or auditing device 60 may recalculate the hash value for the wager data at any time to ensure that none of the wager data was altered and that no wagers were made after the original wager data hash value H1 was sent to verification device 40.

Other embodiments are within the scope of the following claims.

What is claimed is:

1. A system for determining whether wager data for players' wagers placed on a drawing game have been altered after winning game elements are drawn, comprising:

a host computer for storing the wager data and generating a first hash value for the wager data at a time prior to drawing the winning game elements, the host computer being capable of generating a second hash value for the wager data at a time subsequent to drawing the winning game elements for comparison to the first hash value; and a verification device for receiving the first hash value for the wager data prior to drawing the winning game elements and for receiving the winning game elements;

wherein the verification device generates a combination hash value for the winning game elements and the first hash value, and transmits the combination hash value and the winning game elements to the host computer.

2. The system according to claim 1 wherein the wager data includes players' game numbers and wager amounts.

3. The system according to claim 1 wherein the host computer generates an intermediate hash value prior to generating the first hash value.

4. The system according to claim 1 wherein the host computer generates a transaction hash value for each of the players' wagers.

5. The system according to claim 1 wherein the host computer generates a first digital signature to uniquely identify the host computer, and appends the first digital signature to the first hash value.

6. The system according to claim 5, and further comprising a drawing device for drawing the winning game elements, wherein the verification device generates a second digital signature to uniquely identify the drawing device, and appends the second digital signature to the combination hash value.

7. The system according to claim 1 wherein the host computer generates a check hash value for the winning game elements and the first hash value, and compares the check hash value to the combination hash value.

8. The system according to claim 1 wherein the host computer includes a memory for storing the wager data and the first hash value.

9. The system according to claim 1 further comprising a gaming terminal for generating the wager data.

10. The system according to claim 1 further comprising a drawing device for drawing the winning game elements.

11. The system according to claim 1 further comprising an auditing device in communication with the host computer for generating a third hash value for the wager data and comparing the first hash value to the third hash value.

12. A method of detecting whether any of a plurality of stored wager data for players' wagers placed on a drawing game has been altered after winning game elements are drawn, comprising:

generating a first hash value for the plurality of stored wager data before the winning game elements are drawn;

generating a second hash value for the plurality of stored wager data after the winning game elements are drawn;

comparing the first hash value to the second hash value; and generating a combination hash value for the winning game elements and the first hash value.

13. The method of claim 12 further comprising determining that at least a portion of the plurality of stored wager data has been altered based on a comparison of the first hash value and the second hash value.

14. The method of claim 12 further comprising transmitting the first hash value to an independent location before the winning game elements are drawn.

15. The method of claim 12 wherein the first hash value and the second hash value are generated using a one-way hashing function.

16. The method of claim 12 further comprising generating an intermediate hash value based on a portion of the plurality of stored wager data prior to generating the first hash value.

17. The method of claim 12 further comprising generating a transaction hash value based on the stored wager data for each of the players' wagers.

18. The method of claim 12 further comprising generating a check hash value for the winning game elements and the first hash value; and comparing the combination hash value to the check hash value.

19. A method of securing a plurality of wager data for players' wagers placed on a drawing game, comprising:

generating a wager data hash value for the plurality of wager data at a first location;

sending the wager data hash value to a second location;

drawing the winning game elements;

generating a combination hash value for the wager data hash value and the winning game elements at the second location; and transmitting the winning game elements and the combination hash value to the first location.

20. The method of claim 19 further comprising generating a check hash value for the wager data hash value and the winning game elements at the first location; and comparing the combination hash value to the check hash value.

21. The method of claim 19 further comprising appending a digital signature to the combination hash value at the second location.

* * * * *